US009708210B2

(12) United States Patent
Nguyen et al.

(10) Patent No.: US 9,708,210 B2
(45) Date of Patent: Jul. 18, 2017

(54) STRIAE-FREE CHALCOGENIDE GLASSES

(71) Applicants: Vinh Q. Nguyen, Fairfax, VA (US);
Mikhail Kotov, Silver Spring, MD (US); Daniel J. Gibson, Cheverly, MD (US); Shyam S. Bayya, Ashburn, VA (US); Jasbinder S. Sanghera, Ashburn, VA (US)

(72) Inventors: Vinh Q. Nguyen, Fairfax, VA (US);
Mikhail Kotov, Silver Spring, MD (US); Daniel J. Gibson, Cheverly, MD (US); Shyam S. Bayya, Ashburn, VA (US); Jasbinder S. Sanghera, Ashburn, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 13 days.

(21) Appl. No.: 14/712,338

(22) Filed: May 14, 2015

(65) Prior Publication Data

US 2015/0344342 A1 Dec. 3, 2015

Related U.S. Application Data

(60) Provisional application No. 62/007,245, filed on Jun. 3, 2014.

(51) Int. Cl.
*C03B 5/06* (2006.01)
*C03B 5/16* (2006.01)
*C03C 3/32* (2006.01)

(52) U.S. Cl.
CPC ............... *C03C 3/321* (2013.01); *C03B 5/06* (2013.01); *C03B 5/16* (2013.01); *C03B 2201/86* (2013.01)

(58) Field of Classification Search
None
See application file for complete search history.

(56) References Cited

U.S. PATENT DOCUMENTS

| | | | | | |
|---|---|---|---|---|---|
| 3,154,424 | A | * | 10/1964 | Bailey | C03C 3/321 501/40 |
| 3,824,087 | A | * | 7/1974 | Cornet et al. | C03B 27/03 252/500 |
| 5,160,521 | A | * | 11/1992 | Tran | C03B 37/01268 65/130 |
| 5,735,927 | A | * | 4/1998 | Sanghera | C03B 37/01211 65/36 |
| 6,405,565 | B1 | * | 6/2002 | Aitken | C03B 5/06 249/137 |
| 6,634,189 | B1 | * | 10/2003 | Hudgens | C03B 5/02 501/40 |

(Continued)

OTHER PUBLICATIONS

Sanghera, Jasbinder S., et al. "IR fiber optics development at the Naval Research Laboratory." Symposium on Integrated Optoelectronics. International Society for Optics and Photonics, 2000.

(Continued)

*Primary Examiner* — Cynthia Szewczyk
(74) *Attorney, Agent, or Firm* — US Naval Research Laboratory; Stephen T. Hunnius

(57) ABSTRACT

A method to synthesize striae-free chalcogenide glass using melt processing. A striae-free chalcogenide glass with uniform refractive index.

7 Claims, 8 Drawing Sheets

(56) References Cited

U.S. PATENT DOCUMENTS

| | | | |
|---|---|---|---|
| 7,116,888 B1* | 10/2006 | Aitken | C03C 3/321 385/141 |
| 2005/0229636 A1* | 10/2005 | Nguyen | C03C 3/321 65/33.1 |
| 2007/0074541 A1* | 4/2007 | Badding | C03B 19/106 65/413 |
| 2010/0022378 A1* | 1/2010 | Nguyen | C03B 5/06 501/40 |
| 2010/0064731 A1* | 3/2010 | Nguyen | C03B 37/01265 65/434 |

OTHER PUBLICATIONS

Sanghera, J. S., et al. "Applications of chalcogenide glass optical fibers at NRL." Journal of Optoelectronics and Advanced Materials 3.3 (2001): 627-640.

Sanghera, Jasbinder S., et al. "Development of low-loss IR transmitting chalcogenide glass fibers." Photonics West'95. International Society for Optics and Photonics, 1995.

* cited by examiner

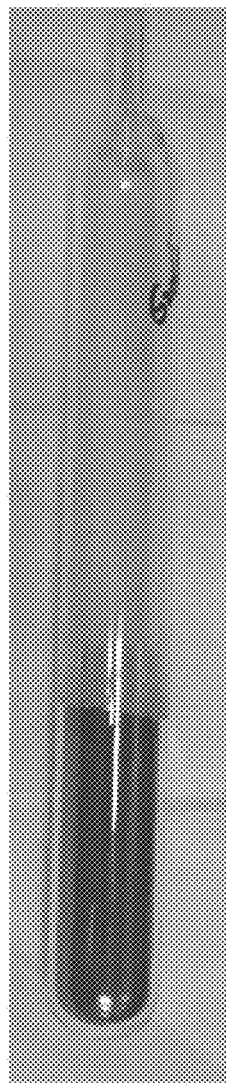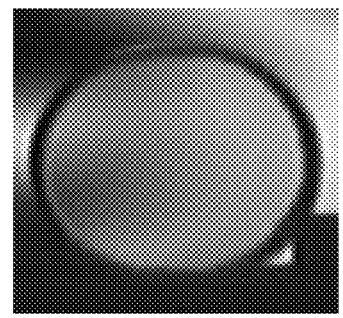
FIG 7A                    FIG 7B

STRIAE-FREE CHALCOGENIDE GLASSES

REFERENCE TO RELATED APPLICATION

This application claims priority to and the benefits of U.S. Patent Application No. 62/007,245 filed on Jun. 3, 2014, the entirety of which is herein incorporated by reference.

BACKGROUND

The high quality glasses of the present invention produce high optical quality chalcogenide fibers. Chalcogenide glasses are comprised of at least one chalcogen element (S, Se or Te) and other elements including, but not limited to, Ge, As, Ga, Sn, Sb, and transmit infrared light from between about 1 µm to about 12 µm or greater, depending on composition.

The infrared transmitting chalcogenide glasses and optical fibers encompass the IR region of interest with numerous applications including thermal imaging, temperature monitoring, and medical applications. Also, the chalcogenide glass fibers may be developed for IR missile warning systems and laser threat warning systems to provide superior aircraft survivability, and high energy IR power delivery using for example, but not limited to, CO (5.4 µm) and $CO_2$ (10.6 µm) lasers.

In addition, these fibers may be developed for remote fiber optic chemical sensor systems for military facility clean up and other industrial applications. Chalcogenide glasses may also be used as bulk optical elements, including windows, lenses, prisms, beam splitters and the like, and must be the highest compositional uniformity and homogeneity in order to maintain accurate control of light rays passing through the glass and to achieve satisfactory optical results.

The chalcogenide glasses and fibers described herein, and more specifically arsenic sulfide based glasses and fibers, are developed for use in many defense applications including high energy IR laser power delivery for infrared countermeasures and defense facility clean up. High quality infrared transmitting optical fibers enable application in remote chemical sensors to detect contaminants in groundwater, environmental pollution monitoring, other civil/industrial process monitoring applications as well as Raman amplifiers and all optical ultra-fast switches for telecommunications, and fiber sources in the infrared for sensors. In addition, IR fibers are needed for biomedical surgery and tissue diagnostics.

To date, the prior art method to synthesize a chalcogenide glass from a melt is to heat the elemental precursors in an evacuated and sealed silica (quartz) glass ampoule and is demonstrated here by example.

Prior Art Process to Make Arsenic Sulfide-Based Glasses

First, arsenic and sulfur precursors sufficient to constitute a glass with the composition of 39% at. As and 61% at. S (71.88 grams and 48.12 grams respectively for a total of 120 grams) were loaded in a silica ampoule under an inert (e.g. Ar or nitrogen gas) atmosphere. The ampoule was connected to a vacuum pump and evacuated for 4 hours at $1\times10^{-5}$ Torr. The ampoule was sealed using a methane/oxygen torch and placed inside a rocking furnace with a ±45° angle of inclination (FIG. 1) where it was heated and rocked according to a glass melting schedule, an example of which is shown for $As_{39}S_{61}$ glass in Table 1.

In Step 1, the top and bottom zones of the furnace were heated at a rate of 3° C./min from 20° C. (room temperature) to 750° C. The furnace then remained at 750° C. for 10 hours and was actively rocked at an inclination angle of ±45° to facilitate mixing and homogenization of the elemental components.

In Step 2, the furnace motion was stopped and the furnace was set to a vertical position (90° fixed angle) and held at temperature (750° C.) for 1 hour to facilitate fining and settling of the glass melt.

In Step 3, the temperatures of both zones were reduced at a rate of 5° C./min to 440° C. and the temperature was held at 440° C. for 2 hrs.

In Step 4, the hot ampoule was removed from the furnace and submerged in a room temperature water bath for 30 seconds to quench the glass, and was then placed in another furnace at 180° C. for 10 hours to anneal the solid glass.

TABLE 1

Example of a prior art glass melting schedule for $As_{39}S_{61}$ glass composition in a two-zone furnace.

| Step | Heating Rate (° C./min) | Temperature (° C.) Top Zone | Temperature (° C.) Bottom Zone | Dwell (Hours) | Furnace Position |
|---|---|---|---|---|---|
| 1 | 3 | 750 | 750 | 10 | Rocking at ± 45° inclination |
| 2 | — | 750 | 750 | 1 | Vertical 90° fixed |
| 3 | 5 | 440 | 440 | 2 | Vertical 90° fixed |
| 4 | | | Water quench | | |

In Step 3 of the prior art process, although the top and bottom zones of the furnace are both set at the same temperature (440° C. in the example) the actual measured temperature along the length of the ampoule containing the glass melt may vary. A temperature gradient (ΔT) of 12° C. has been measured in the example (shown schematically in FIG. 2) and is due largely to convection heat loss through the top of the furnace. The effect of convection heat loss causes thermal convection currents within the bulk glass (shown as dashed curves in FIG. 3A), resulting in the condensation of glass beads above the melt at the cooler section of the ampoule which then drip back into the melt (shown in FIG. 3A & FIG. 3B).

These condensation beads may have a different composition than the rest of the glass melt and this continual mass fluxing cycle can cause a compositional non-uniformity throughout the entire melt.

Furthermore, as the glass cools during Step 3, the composition of the glass near the surface is changing as condensation of gaseous components (e.g. sulfur) from the closed system settle on the surface of the glass melt. Thermal convection currents within the glass are present during cooling and allow this surface glass, with a slightly different composition, to become reincorporated into the bulk glass.

The convection currents or swirls are not sufficient to thoroughly distribute or homogenize the glass, resulting in compositional gradients within the glass.

During water quenching of Step 4, the viscosity of the glass increases as the glass melt cools and the compositional gradients become frozen resulting in striae in the bulk glass.

Consequently, there are refractive index perturbations in the striae-containing glass that degrade the quality of the glass and fiber made from this glass. FIG. 4 shows an IR-image of a human hand and fingers viewed through a 1 inch diameter, 2.5 inches thick disk (both faces polished) of $As_{39}S_{61}$ glass of this example that was prepared using the method of the prior art, and reveals the presence of striae and refractive index perturbations within the glass.

The invention disclosed herein solves these long-standing problems and results in striae-free chalcogenide glasses with uniform refractive index.

BRIEF SUMMARY OF THE INVENTION

This disclosure describes a new process to make striae-free chalcogenide glasses with uniform refractive index.

BRIEF DESCRIPTION OF THE DRAWINGS

FIG. 7A illustrates a photo of ampoule with no glass condensation above the glass melt.

FIG. 7B illustrates an IR-image of a human hand and fingers viewed through a 1 inch diameter, 2.5 inches thick disk (both faces polished) of an $As_{39}S_{61}$ glass of the present invention showing no striae in the uniform bulk glass.

DETAILED DESCRIPTION

Described herein is a new method to synthesize striae-free chalcogenide glass using melt processing. One embodiment is described in the example using $As_{39}S_{61}$ glass.

EXAMPLE 1

Process of the Present Invention to Make Striae-Free Arsenic Sulfide Glasses

Arsenic and sulfur precursors sufficient to constitute a 120 gram batch of glass with the composition of 39% at. As and 61% at. S (71.88 grams and 48.12 grams respectively) were loaded in a silica ampoule under an inert gas atmosphere.

The ampoule was connected to a vacuum pump and evacuated for 4 hours at $1 \times 10^{-5}$ Torr.

Figure 5:
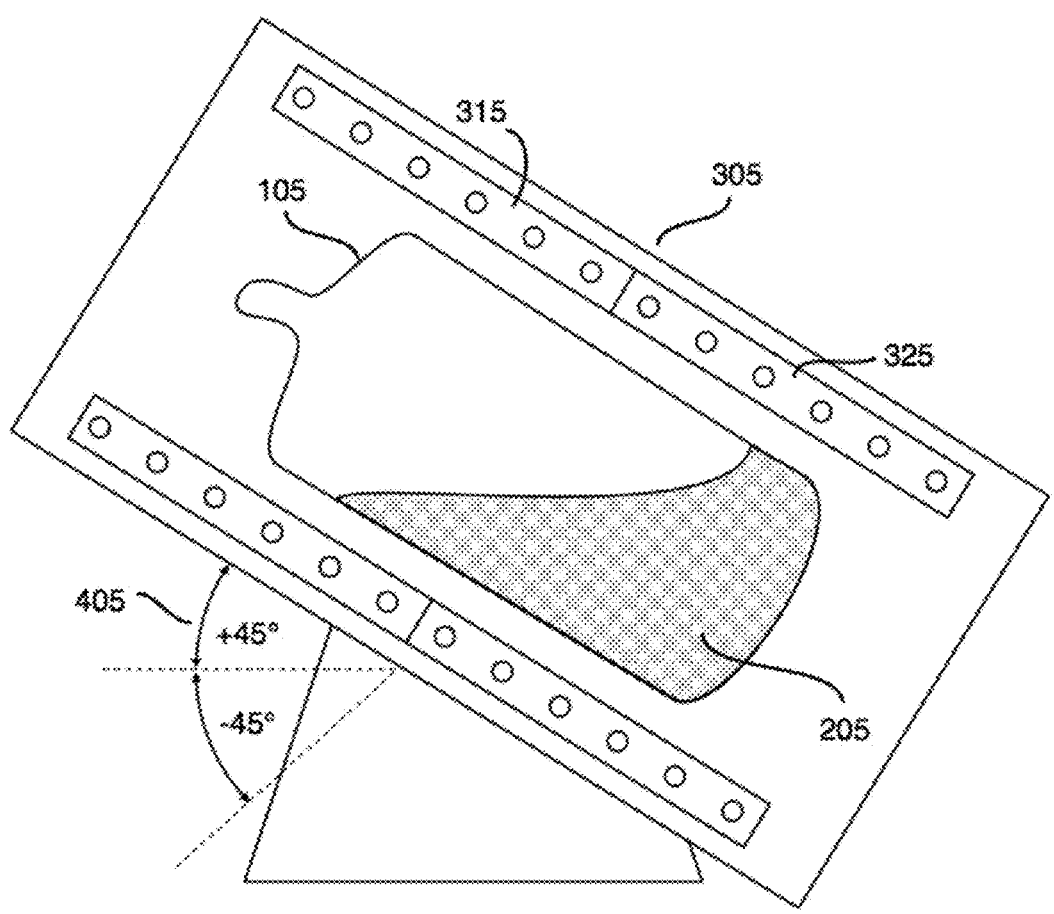
FIG. 5 illustrates a schematic overview of the furnace used in the current invention to synthesize chalcogenide glasses by melt processing. A sealed quartz ampoule (105) containing arsenic sulfide (205) glass melt precursors inside a rocking furnace (305) having two independently controllable temperature zones (315, 325) with a ±45° inclination angle (405).

The ampoule was sealed using a methane/oxygen torch and placed inside a rocking furnace with a ±45° angle of inclination and two independently controllable temperature zones (shown in FIG. 5) where it was heated and rocked according to a glass melting schedule, an example of which is shown for $As_{39}S_{61}$ glass in Table 2.

In Step 1, the top and bottom zones of the furnace were heated at a rate of 3° C./min from 20° C. (room temperature) to 850° C. (top) and 750° C. (bottom).

In Step 2, the temperature of the top zone (850° C.) and bottom zone (750° C.) were held constant for 10 hours while the furnace was rocked at an inclination angle of ±45° to facilitate mixing and homogenization of the elemental components.

In Step 3, the furnace motion was stopped and the furnace was set to a vertical position (90° fixed angle). At the same time, the temperatures of the top zone and bottom zone were decreased at a rate of 1° C./min to 800° C. (top) and 700° C. (bottom). This furnace position and temperature profile were held for 24 hours to facilitate fining and settling of the glass melt.

In Step 4, the temperatures of the top zone and the bottom zone were reduced at a rate of 0.6° C./min to 370° C. (top) and 260° C. (bottom). These temperatures were held for 12 hours.

In Step 5, the hot ampoule was removed from the furnace, submerged in a room temperature water bath for 10 seconds to quench the glass, and was placed in another furnace at 180° C. for 10 hours to anneal the solid glass.

TABLE 2

Glass melting schedule for $As_{39}S_{61}$ glass composition in a two-zone furnace using the present invention.

| Step | Heating Rate (° C./min) | Temperature (° C.) Top Zone | Temperature (° C.) Bottom Zone | Dwell (Hours) | Furnace Position |
|---|---|---|---|---|---|
| 1 | 3 | 850 | 750 | 1 | Horizontal 0° fixed |
| 2 | — | 850 | 750 | 10 | Rocking at ± 45° inclination |

TABLE 2-continued

Glass melting schedule for $As_{39}S_{61}$ glass composition in a two-zone furnace using the present invention.

| Step | Heating Rate (° C./min) | Temperature (° C.) Top Zone | Temperature (° C.) Bottom Zone | Dwell (Hours) | Furnace Position |
|---|---|---|---|---|---|
| 3 | 1 | 800 | 700 | 24 | Vertical 90° fixed |
| 4 | 0.6 | 360 | 260 | 12 | Vertical 90° fixed |
| 5 | | | Water quench | | |

Step 1 of the present invention allows for an initial melting of precursor materials prior to rocking for homogenization and reduces the potential of abrasion of the ampoule by solid precursors during the next step, which is not a part of the prior art process.

Step 2 here allows for a temperature gradient in the ampoule to encourage mixing and homogenization during rocking.

In Step 3 of the process of the present invention, the ampoule containing the glass melt is positioned such that the glass melt is largely confined within the bottom zone of the furnace and it is being fined at high temperature (700° C.) for a longer time than in the prior art method (24 hours in this example compared to 1 hour in the prior art method) which encourages homogenization.

The temperature of the top zone in this step is set to a higher temperature (800° C.) than the bottom zone, which has two benefits: 1) convection currents within the glass melt are reduced and 2) condensation and mass fluxing within the glass melt are prevented.

This temperature gradient eliminates the main causes of striae and therefore reduces compositional variations in the molten glass compared with the prior art.

Figure 1:
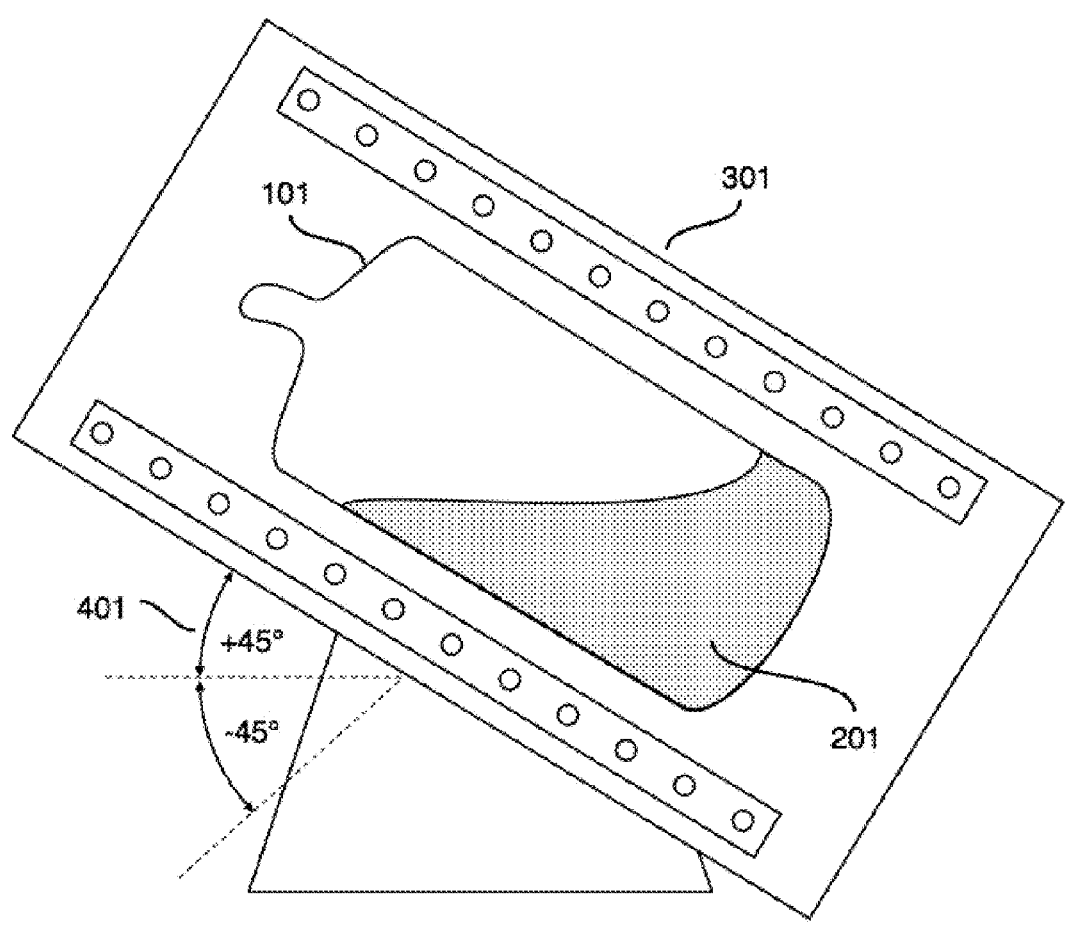
FIG. 1 illustrates a schematic overview of the prior art process to synthesize chalcogenide glasses by melt processing. A sealed quartz ampoule (101) containing arsenic sulfide (201) glass melt precursors inside a rocking furnace (301) with a ±45° inclination angle (401).
Figure 2:
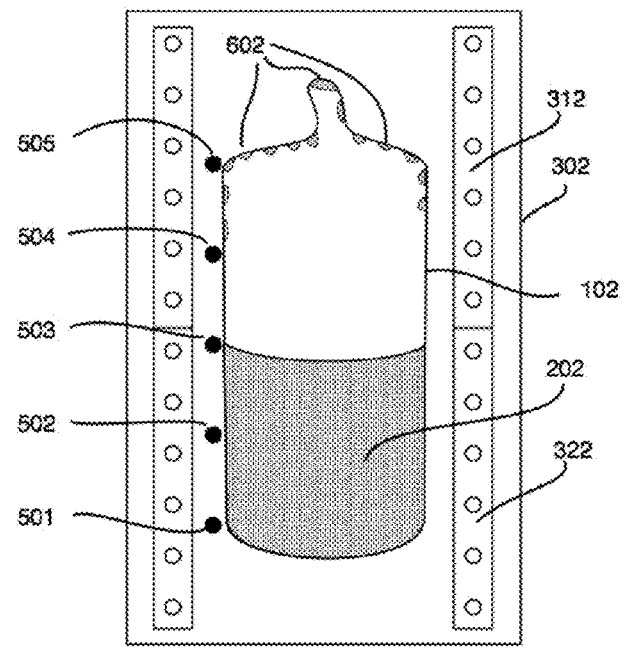
FIG. 2 illustrates a schematic overview of rocking furnace (302) in vertical (90°) fixed position during Step 3 of the prior art process and measured temperatures at various points (501, 502, 503, 504, 505) along the length of the ampoule (102) containing $As_{39}S_{61}$ glass melt (302) in the prior art example immediately prior to glass quenching Step 4. In this example the top zone (312) and bottom zone (322) are set to the same temperature (440° C.) and beads of condensed glass (602) are seen to form at the top of the ampoule.
Figure 3A:
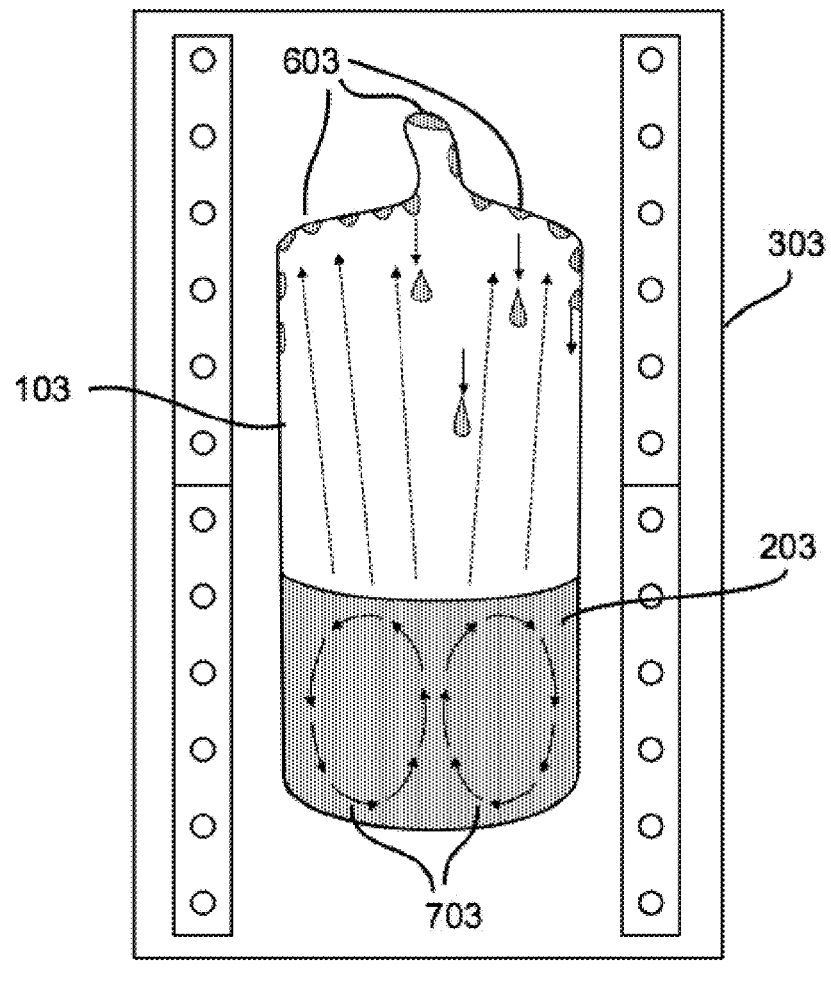
FIG. 3A illustrates a schematic diagram of thermal convection current (703) in the bulk $As_{39}S_{61}$ glass (203) and glass condensation drops (603) on top of the cooler ampoule (103) inside the furnace (303) of the prior art process.
Figure 3B:
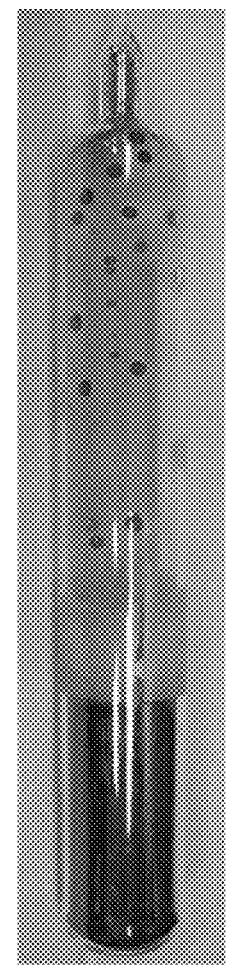
FIG. 3B illustrates a photo of said ampoule with glass condensation above the glass melt.
Figure 4:
FIG. 4 illustrates an IR-image of a human hand and fingers viewed through a 1 inch diameter, 2.5 inches thick disk (both faces polished) of $As_{39}S_{61}$ glass showing striae in the prior art bulk glass.

In Step 4, the temperatures of the top zone and bottom zones are decreased slowly (0.6° C./min compared to 5° C./min in Step 3 of the prior art method) while keeping the top zone (360° C.) 100° C. hotter than the bottom zone (260° C.). Note that this differs from Step 3 of the prior art method, which allows for a natural temperature gradient within the furnace permitting the bottom of the glass to be hotter than the top as shown in FIG. 2.

This slow ramp rate and a consistent 100° C. higher temperature in the top zone prevent thermal convection within the glass in this stage which allows the uniform conditions in the molten glass to remain as the glass cools and prevents the reincorporation of surface glass into the bulk glass during this step.

Figure 6:
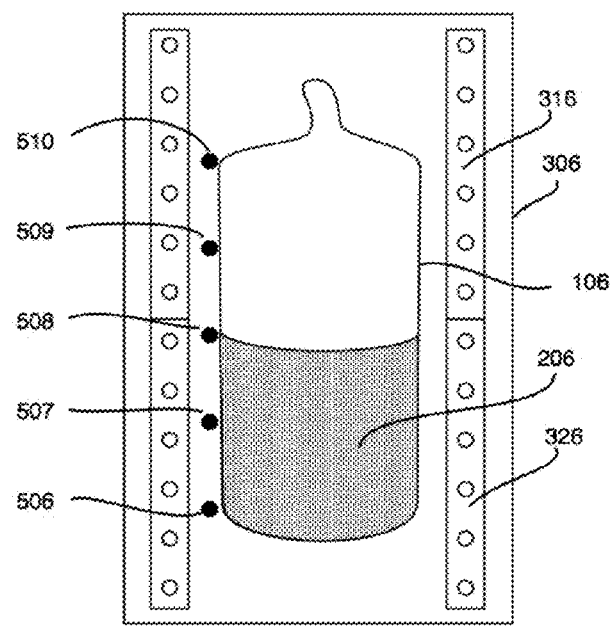
FIG. 6 illustrates a schematic overview of a rocking furnace (306) in vertical (90°) fixed position during Step 5 of the process of the present invention and measured temperatures at various points (506, 507, 508, 509, 510) along the length of the quartz ampoule (106) containing arsenic sulfide glass melt (206). The top zone (316) was set to 360° C. and the bottom zone (326) was set to 260° C. in this example.

FIG. 6 shows the actual measured temperatures of the top and bottom zones of the furnace during the dwell portion of Step 4 in this example.

During water quenching of Step 5, the viscosity of the glass increases rapidly as the glass melt cools but thermal stresses are less compared to the method of the prior art due to the slow cool rate and long dwell in Step 4 and the shorter quench time in the method of the present invention.

FIG. 7A shows a photo of an $As_{39}S_{61}$ glass of the present invention inside an ampoule with no glass condensation above the glass melt, and FIG. 7B shows an IR-image of a human hand and fingers viewed through a 1 inch diameter, 2.5 inches thick disk (both faces polished) of an $As_{39}S_{61}$ glass of the present invention with no detectable striae or refractive index perturbations in the bulk glass.

The process of the present invention produces striae-free and high optical quality chalcogenide glasses. The uniform and homogeneous glasses are free from refractive index perturbations.

The process of the present invention has several advantages over the conventional process of the prior art. For example, thermal convection heat loss, convection current and mass flux are eliminated within the bulk molten glass by setting the temperature of the top zone at least 100° C. (or thereabouts) higher than the bottom zone through all steps of the process.

Another advantage is the controlled slow cooling enables thermal equilibrium and steady state to occur in the molten glass melt throughout the process. This contributes to a striae-free, lower energy, and stable state of the glass melt just before quenching.

Figure 8:
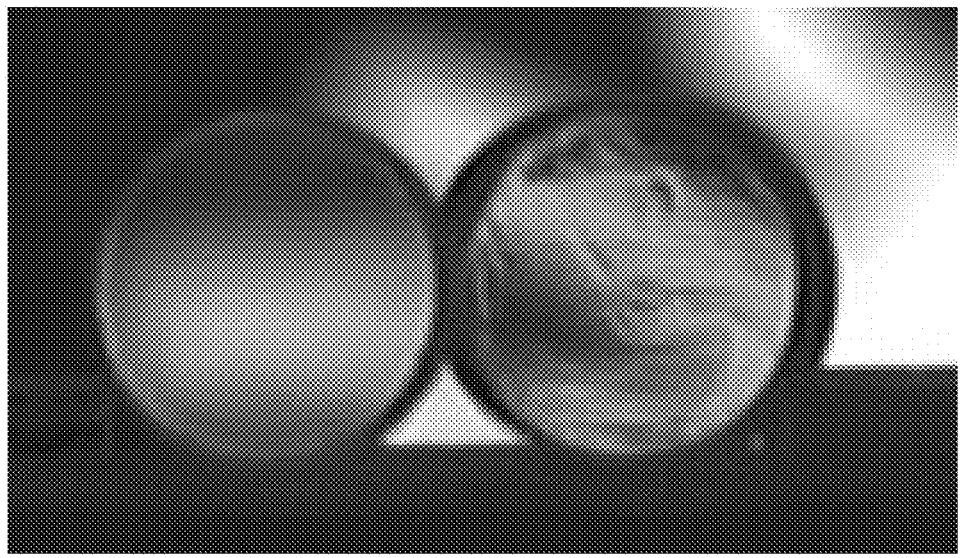
FIG. 8 illustrates an IR image of human hand and fingers viewed through arsenic sulfide glass disks produced from (left) new process with striae-free glass and (right) old conventional process with striae swirl in the glass.

Still another advantage is striae-free and uniform compositions in the bulk glass eliminate refractive index perturbations enabling glass with higher optical quality for high-performance IR fibers and refractive optical elements. FIG. 8 shows a side-by-side comparison of striae free glasses prepared using the method of the present invention (left) and the method of the prior art (right).

This invention has been demonstrated using $As_{39}S_{61}$ glass in the above example but can also be applied to other chalcogenide glasses such as, but not limited to, As—S-based glasses with different compositions, As—Se, Ge—As—Se and Ge—As—Se—Te-based glasses and other multi-component chalcogenide and chalcohalide glasses. The present invention could also be applied to the fabrication of other glasses, for example silicates, borates, fluorides, phosphates and others, or processing of viscous liquids, for example polymer melts, metals, salts and other liquids, where homogeneity is desired.

Many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What we claim is:

1. A method to synthesize striae-free chalcogenide glass using melt processing, comprising the steps of:
    melting chalcogenide glass inside a sealed silica ampoule;
    providing a 2-zone furnace comprising an upper zone and a lower zone wherein the upper zone is at a higher temperature than the lower zone and wherein the zones are independently controllable temperature zones;
    mixing by rocking the sealed silica ampoule inside the 2-zone furnace;
    placing the sealed silica ampoule in a vertical position;
    forming a glass melt as the upper zone is at a higher temperature than the lower zone;
    positioning the glass melt such that the glass melt is within the lower zone; and
    cooling slowly and quenching the temperature;
    reducing the temperature of the upper zone at a rate of 0.6° C./min to 370° C.;

reducing the temperatures of the lower zone at a rate of 0.6° C./min to 260° C.;

holding these temperatures for 12 hours; and thereby forming the striae-free chalcogenide glass.

2. The method to synthesize striae-free chalcogenide glass using melt processing of claim 1, further comprising the step of preventing convection currents within the glass melt as the glass melt solidifies forming the chalcogenide glass.

3. The method to synthesize striae-free chalcogenide glass using melt processing of claim 2, further comprising the step of preventing condensation of glass on the ampoule as the glass melt cools.

4. The method to synthesize striae-free chalcogenide glass using melt processing of claim 1, further comprising the steps of:

allowing for an initial melting of the chalcogenide glass prior to the step of mixing by rocking; and allowing for homogenization of the chalcogenide glass.

5. The method to synthesize striae-free chalcogenide glass using melt processing of claim 4, further comprising the step of avoiding abrasion of the ampoule during the rocking step.

6. The method to synthesize striae-free chalcogenide glass using melt processing of claim 1, further comprising the steps of:

maintaining the temperature of the lower zone at a temperature of about 700° C. for about 24 hours; and maintaining the temperature of the upper zone at a temperature of about 100° C. greater than the temperature of the lower zone for about 24 hours.

7. A method to synthesize striae-free chalcogenide glass using melt processing, comprising the steps of:

loading arsenic and sulfur precursors sufficient to constitute a 120 gram batch of glass with the composition of 39% at. arsenic (As) and 61% at. sulphur (S) or about 71.88 grams As and 48.12 grams S into a silica ampoule under an inert gas atmosphere;

connecting the ampoule to a vacuum pump;

evacuating the ampoule for 4 hours at $1 \times 10^{-5}$ Torr;

sealing the ampoule;

placing the ampoule inside a rocking furnace with a ±45° angle of inclination wherein the furnace has a top zone and a bottom zone and wherein the zones are independently controllable temperature zones;

heating and rocking the ampoule;

heating the top zone and the bottom zone of the furnace at a rate of 3° C./min from room temperature;

heating the top zone to 850° C.;

heating the bottom zone to 750° C.;

holding constant the temperature of the top zone (850° C.) and bottom zone (750° C.) for 10 hours;

rocking the furnace at an inclination angle of ±45° to facilitate mixing and homogenization of the elemental components;

stopping the furnace motion;

setting the furnace to a vertical position or 90° fixed angle;

decreasing the temperature of the top zone at a rate of 1° C./min to 800° C.;

decreasing the temperature of the bottom zone at a rate of 1° C./min to 700° C.;

holding the furnace position and temperature profile for 24 hours to facilitate fining and settling of the glass melt;

reducing the temperature of the top zone at a rate of 0.6° C./min to 370° C.;

reducing the temperatures of the bottom zone at a rate of 0.6° C./min to 260° C.;

holding these temperatures for 12 hours;

forming a chalcogenide glass;

removing the ampoule from the furnace;

submerging the ampoule in a room temperature water bath for 10 seconds to quench the chalcogenide glass;

annealing the chalcogenide glass by placing the ampoule in another furnace at 180° C. for 10 hours; and forming a striae-free chalcogenide glass.

* * * * *